(12) United States Patent
Hildesheim et al.

(10) Patent No.: US 9,183,161 B2
(45) Date of Patent: Nov. 10, 2015

(54) APPARATUS AND METHOD FOR PAGE WALK EXTENSION FOR ENHANCED SECURITY CHECKS

(71) Applicant: Intel Corporation, Santa Clara, CA (US)

(72) Inventors: Gur Hildesheim, Haifa (IL); Ittai Anati, Haifa (IL); Hisham Shafi, Akko (IL); Shlomo Raikin, Ofer (IL); Gideon Gerzon, Zichron Yaakov (IL); Uday R Savagaonkar, Portland, OR (US); Carlos V Rozas, Portland, OR (US); Francis X McKeen, Portland, OR (US); Michael A Goldsmith, Lake Oswego, OR (US); Dewan Prashant, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 157 days.

(21) Appl. No.: 13/730,563

(22) Filed: Dec. 28, 2012

(65) Prior Publication Data

US 2014/0189274 A1 Jul. 3, 2014

(51) Int. Cl.
*G06F 12/14* (2006.01)
*G06F 21/53* (2013.01)
*G06F 12/08* (2006.01)
*G06F 12/10* (2006.01)

(52) U.S. Cl.
CPC ............ *G06F 12/145* (2013.01); *G06F 12/084* (2013.01); *G06F 12/1027* (2013.01); *G06F 12/1483* (2013.01); *G06F 21/53* (2013.01)

(58) Field of Classification Search
CPC . G06F 12/1483; G06F 12/1491; G06F 21/50; G06F 21/53
USPC ........................................... 711/163, E12.096
See application file for complete search history.

(56) References Cited

U.S. PATENT DOCUMENTS

| | | | |
|---|---|---|---|
| 2001/0018736 A1 | 8/2001 | Hashimoto et al. | |
| 2003/0018876 A1 | 1/2003 | Zahir et al. | |
| 2003/0101322 A1* | 5/2003 | Gardner | 711/163 |
| 2006/0075259 A1* | 4/2006 | Bajikar et al. | 713/189 |
| 2006/0225135 A1* | 10/2006 | Cheng et al. | 726/26 |
| 2007/0050591 A1 | 3/2007 | Boyd et al. | |
| 2007/0055837 A1 | 3/2007 | Rajagopal et al. | |

(Continued)

OTHER PUBLICATIONS

PCT/US2013/047423 Notification of Transmittal of the International Search Report and the Written Opinion of the International Searching Authority, or the Declaration, mailed Oct. 7, 2013, 11 pages.
International Preliminary Report on Patentability for Application No. PCT/US2013/047423, mailed Jul. 9, 2015, 8 pages.

*Primary Examiner* — Hal Schnee
(74) *Attorney, Agent, or Firm* — Nicholson De Vos Webster & Elliott LLP

(57) ABSTRACT

An apparatus and method for managing a protection table by a processor. For example, a processor according to one embodiment of the invention comprises: protection table management logic to manage a protection table, the protection table having an entry for each protected page or each group of protected pages in memory; wherein the protection table management logic prevents direct access to the protection table by user application program code and operating system program code but permits direct access by the processor.

21 Claims, 10 Drawing Sheets

(56) References Cited

U.S. PATENT DOCUMENTS

| | | |
|---|---|---|
| 2007/0061493 A1 | 3/2007 | Boyd et al. |
| 2008/0184373 A1* | 7/2008 | Traut et al. ............ 726/26 |
| 2009/0259846 A1* | 10/2009 | Watt et al. ............ 713/166 |
| 2010/0031360 A1* | 2/2010 | Seshadri et al. ............ 726/24 |
| 2012/0047576 A1* | 2/2012 | Do et al. ............ 726/22 |
| 2012/0110348 A1* | 5/2012 | Hofstee et al. ............ 713/190 |

* cited by examiner

APPARATUS AND METHOD FOR PAGE WALK EXTENSION FOR ENHANCED SECURITY CHECKS

BACKGROUND

1. Field of the Invention

This invention relates generally to the field of computer processors. More particularly, the invention relates to an apparatus and method for extending page walks to enable enhanced security checks.

2. Description of the Related Art

Memory addressing schemes often use a technique called paging to implement virtual memory. When using paging, the virtual address space (i.e., the address space generated by either the execution unit of a processor or by the execution unit in conjunction with a segmentation unit of a processor) is divided into fix sized blocks called pages, each of which can be mapped onto any of the physical addresses (i.e., the addresses that correspond to hardware memory locations) available on the system. In a typical computer system, a memory management unit determines and maintains, according to paging algorithm(s), the current mappings for the virtual to physical addresses using one or more page tables.

Upon receiving a virtual address from the execution unit of a processor, typical memory management units initially translate the virtual address into its corresponding physical address using the page table(s). Since the page table(s) are often stored in main memory, accessing the page tables is time consuming. To speed up the paging translations, certain computer systems store the most recently used translations in a translation look-aside buffer or TLB (a faster memory that is often located on the processor). Upon generating a virtual address requiring translation, the memory management unit first searches for the translation in the TLB before accessing the page table(s). If the translation is stored in the TLB, a TLB "hit" is said to have occurred and the TLB provides the translation. However, if the translation is not stored in the TLB, a TLB "miss" is said to have occurred and a page table walker is invoked to access the page tables and provide the translation.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures and Data Types

Figure 1:
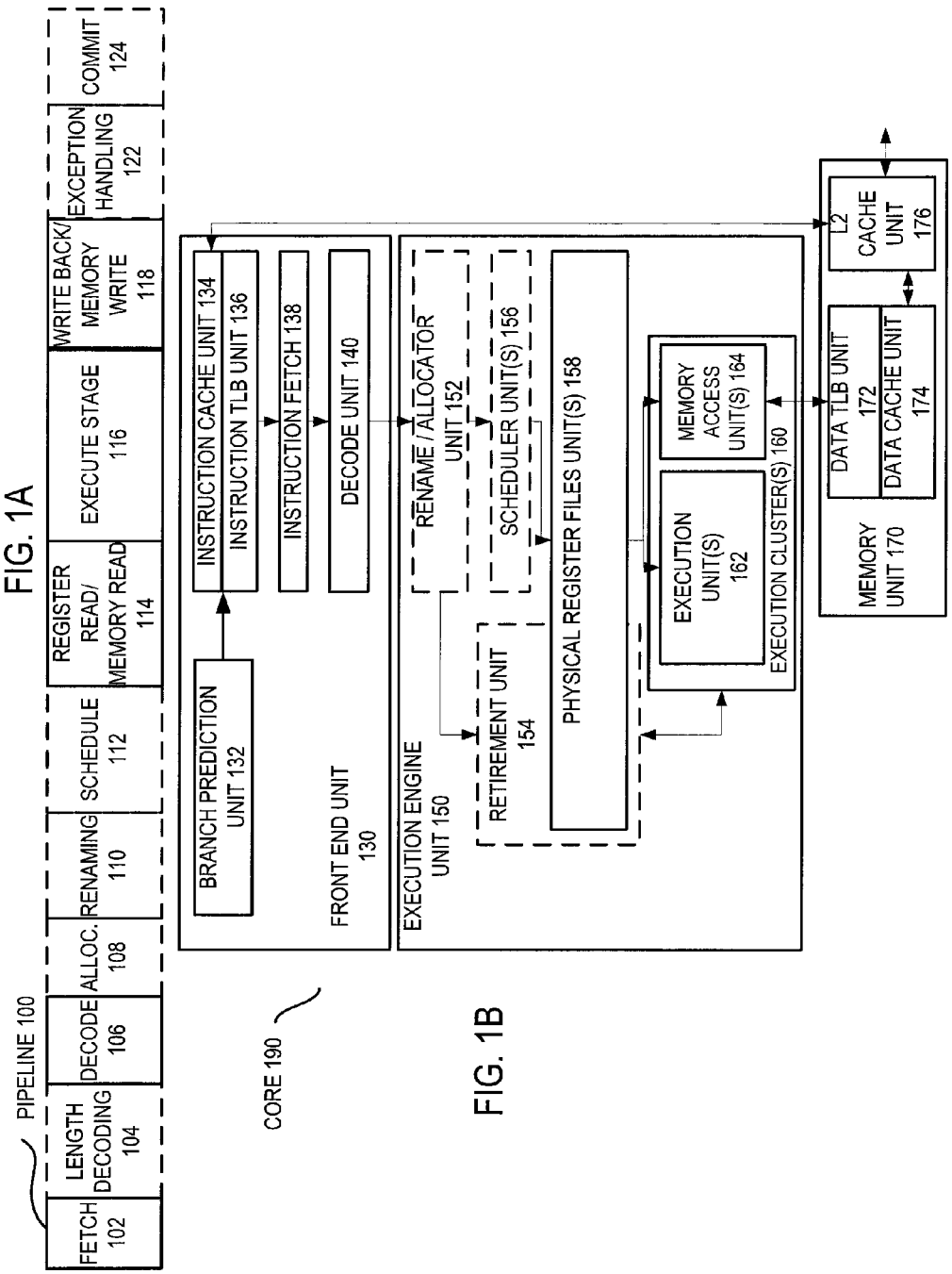
FIG. 1A is a block diagram illustrating both an exemplary in-order pipeline and an exemplary register renaming, out-of-order issue/execution pipeline according to embodiments of the invention.
FIG. 1B is a block diagram illustrating both an exemplary embodiment of an in-order architecture core and an exemplary register renaming, out-of-order issue/execution architecture core to be included in a processor according to embodiments of the invention.

FIG. 1A is a block diagram illustrating both an exemplary in-order pipeline and an exemplary register renaming, out-of-order issue/execution pipeline according to embodiments of the invention. FIG. 1B is a block diagram illustrating both an exemplary embodiment of an in-order architecture core and an exemplary register renaming, out-of-order issue/execution architecture core to be included in a processor according to embodiments of the invention. The solid lined boxes in FIGS. 1A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, microcode entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit, a write mask registers unit, and a scalar registers unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
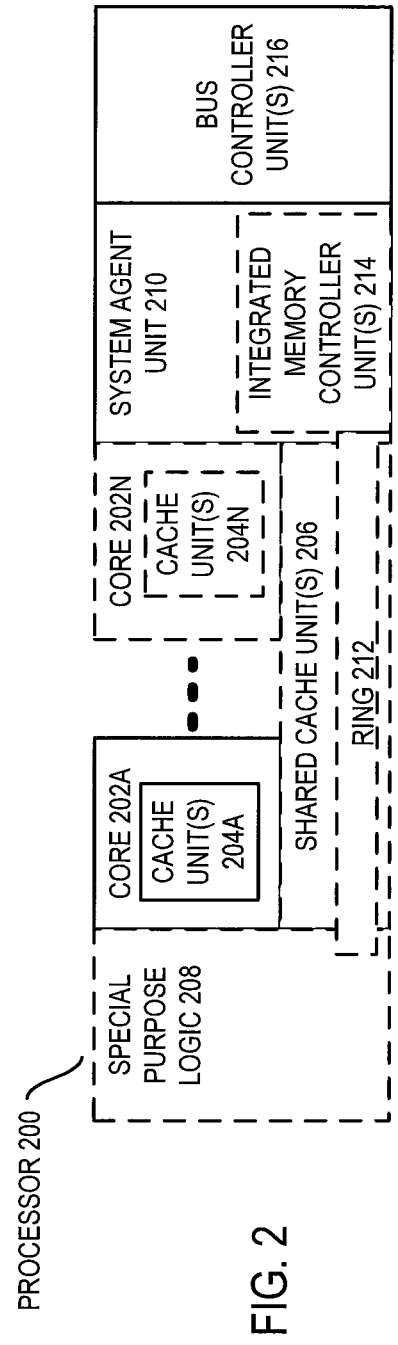
FIG. 2 is a block diagram of a single core processor and a multicore processor with integrated memory controller and graphics according to embodiments of the invention.

FIG. 2 is a block diagram of a processor 200 that may have more than one core, may have an integrated memory controller, and may have integrated graphics according to embodiments of the invention. The solid lined boxes in FIG. 2 illustrate a processor 200 with a single core 202A, a system agent 210, a set of one or more bus controller units 216, while the optional addition of the dashed lined boxes illustrates an alternative processor 200 with multiple cores 202A-N, a set of one or more integrated memory controller unit(s) 214 in the system agent unit 210, and special purpose logic 208.

Thus, different implementations of the processor 200 may include: 1) a CPU with the special purpose logic 208 being integrated graphics and/or scientific (throughput) logic (which may include one or more cores), and the cores 202A-N being one or more general purpose cores (e.g., general purpose in-order cores, general purpose out-of-order cores, a combination of the two); 2) a coprocessor with the cores 202A-N being a large number of special purpose cores intended primarily for graphics and/or scientific (throughput); and 3) a coprocessor with the cores 202A-N being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects the integrated graphics logic 208, the set of shared cache units 206, and the system agent unit 210/integrated memory controller unit(s) 214, alternative embodiments may use any number of well-known techniques for interconnecting such units. In one embodiment, coherency is maintained between one or more cache units 206 and cores 202-A-N.

In some embodiments, one or more of the cores 202A-N are capable of multi-threading. The system agent 210 includes those components coordinating and operating cores 202A-N. The system agent unit 210 may include for example a power control unit (PCU) and a display unit. The PCU may be or include logic and components needed for regulating the power state of the cores 202A-N and the integrated graphics logic 208. The display unit is for driving one or more externally connected displays.

The cores 202A-N may be homogenous or heterogeneous in terms of architecture instruction set; that is, two or more of the cores 202A-N may be capable of execution the same instruction set, while others may be capable of executing only a subset of that instruction set or a different instruction set. In one embodiment, the cores 202A-N are heterogeneous and include both the "small" cores and "big" cores described below.

FIGS. 3-6 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 3:
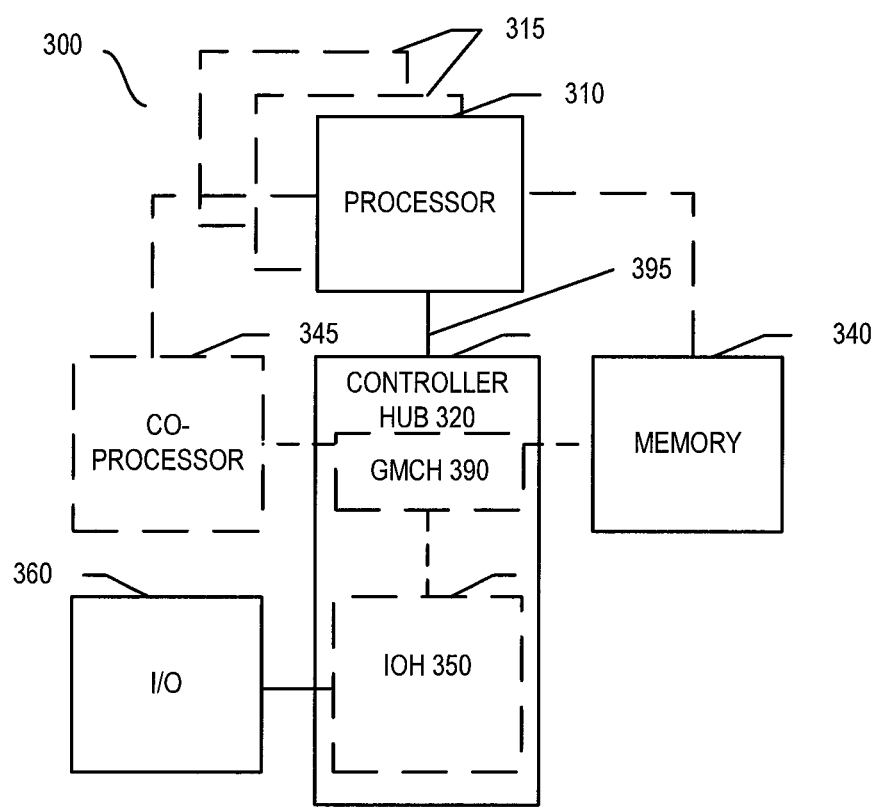
FIG. 3 illustrates a block diagram of a system in accordance with one embodiment of the present invention.

Referring now to FIG. 3, shown is a block diagram of a system 300 in accordance with one embodiment of the present invention. The system 300 may include one or more processors 310, 315, which are coupled to a controller hub 320. In one embodiment the controller hub 320 includes a graphics memory controller hub (GMCH) 390 and an Input/Output Hub (IOH) 350 (which may be on separate chips); the GMCH 390 includes memory and graphics controllers to which are coupled memory 340 and a coprocessor 345; the IOH 350 is couples input/output (I/O) devices 360 to the GMCH 390. Alternatively, one or both of the memory and graphics controllers are integrated within the processor (as described herein), the memory 340 and the coprocessor 345 are coupled directly to the processor 310, and the controller hub 320 in a single chip with the IOH 350.

The optional nature of additional processors 315 is denoted in FIG. 3 with broken lines. Each processor 310, 315 may include one or more of the processing cores described herein and may be some version of the processor 200.

The memory 340 may be, for example, dynamic random access memory (DRAM), phase change memory (PCM), or a combination of the two. For at least one embodiment, the controller hub 320 communicates with the processor(s) 310, 315 via a multi-drop bus, such as a frontside bus (FSB), point-to-point interface such as QuickPath Interconnect (QPI), or similar connection 395.

In one embodiment, the coprocessor 345 is a special-purpose processor, such as, for example, a high-throughput MIC processor, a network or communication processor, compression engine, graphics processor, GPGPU, embedded processor, or the like. In one embodiment, controller hub 320 may include an integrated graphics accelerator.

There can be a variety of differences between the physical resources 310, 315 in terms of a spectrum of metrics of merit including architectural, microarchitectural, thermal, power consumption characteristics, and the like.

In one embodiment, the processor 310 executes instructions that control data processing operations of a general type. Embedded within the instructions may be coprocessor instructions. The processor 310 recognizes these coprocessor instructions as being of a type that should be executed by the attached coprocessor 345. Accordingly, the processor 310 issues these coprocessor instructions (or control signals representing coprocessor instructions) on a coprocessor bus or other interconnect, to coprocessor 345. Coprocessor(s) 345 accept and execute the received coprocessor instructions.

Figure 4:
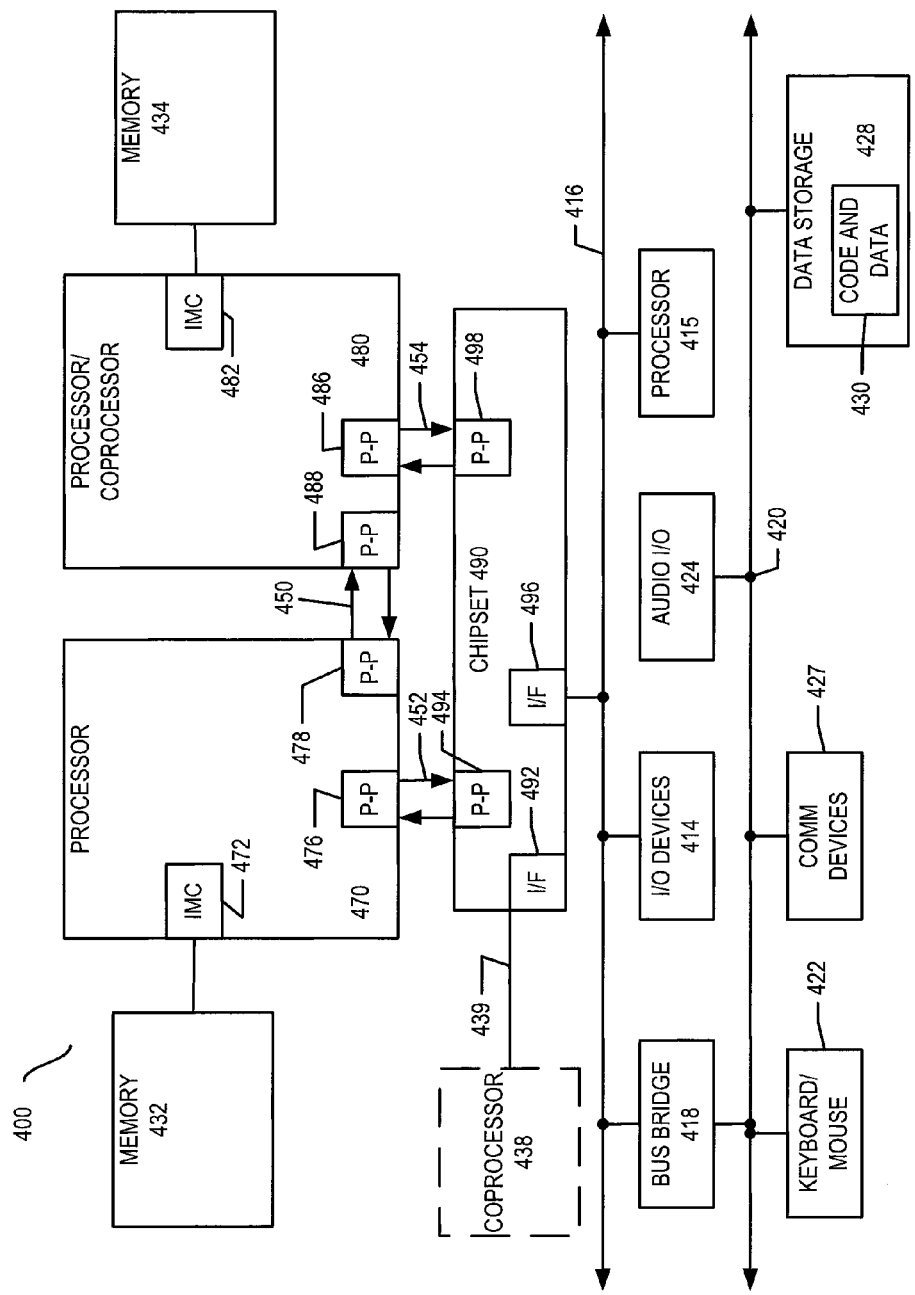
FIG. 4 illustrates a block diagram of a second system in accordance with an embodiment of the present invention.

Referring now to FIG. 4, shown is a block diagram of a first more specific exemplary system 400 in accordance with an embodiment of the present invention. As shown in FIG. 4, multiprocessor system 400 is a point-to-point interconnect system, and includes a first processor 470 and a second processor 480 coupled via a point-to-point interconnect 450. Each of processors 470 and 480 may be some version of the processor 200. In one embodiment of the invention, processors 470 and 480 are respectively processors 310 and 315, while coprocessor 438 is coprocessor 345. In another embodiment, processors 470 and 480 are respectively processor 310 coprocessor 345.

Processors 470 and 480 are shown including integrated memory controller (IMC) units 472 and 482, respectively. Processor 470 also includes as part of its bus controller units point-to-point (P-P) interfaces 476 and 478; similarly, second processor 480 includes P-P interfaces 486 and 488. Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 439. In one embodiment, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

Figure 5:
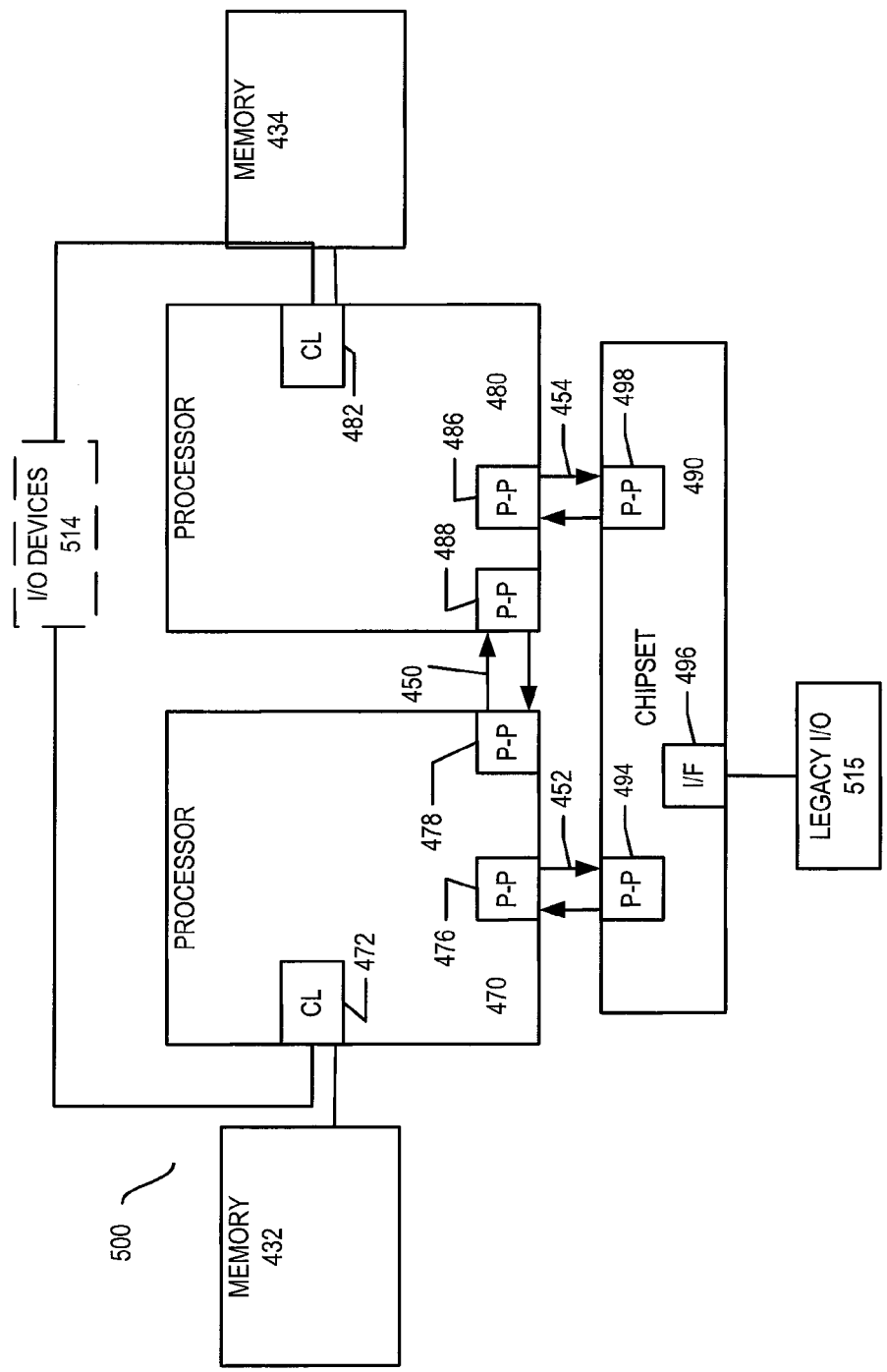
FIG. 5 illustrates a block diagram of a third system in accordance with an embodiment of the present invention.

Referring now to FIG. 5, shown is a block diagram of a second more specific exemplary system 500 in accordance with an embodiment of the present invention. Like elements in FIGS. 4 and 5 bear like reference numerals, and certain aspects of FIG. 4 have been omitted from FIG. 5 in order to avoid obscuring other aspects of FIG. 5.

FIG. 5 illustrates that the processors 470, 480 may include integrated memory and I/O control logic ("CL") 472 and 482, respectively. Thus, the CL 472, 482 include integrated memory controller units and include I/O control logic. FIG. 5 illustrates that not only are the memories 432, 434 coupled to the CL 472, 482, but also that I/O devices 514 are also coupled to the control logic 472, 482. Legacy I/O devices 515 are coupled to the chipset 490.

Figure 6:
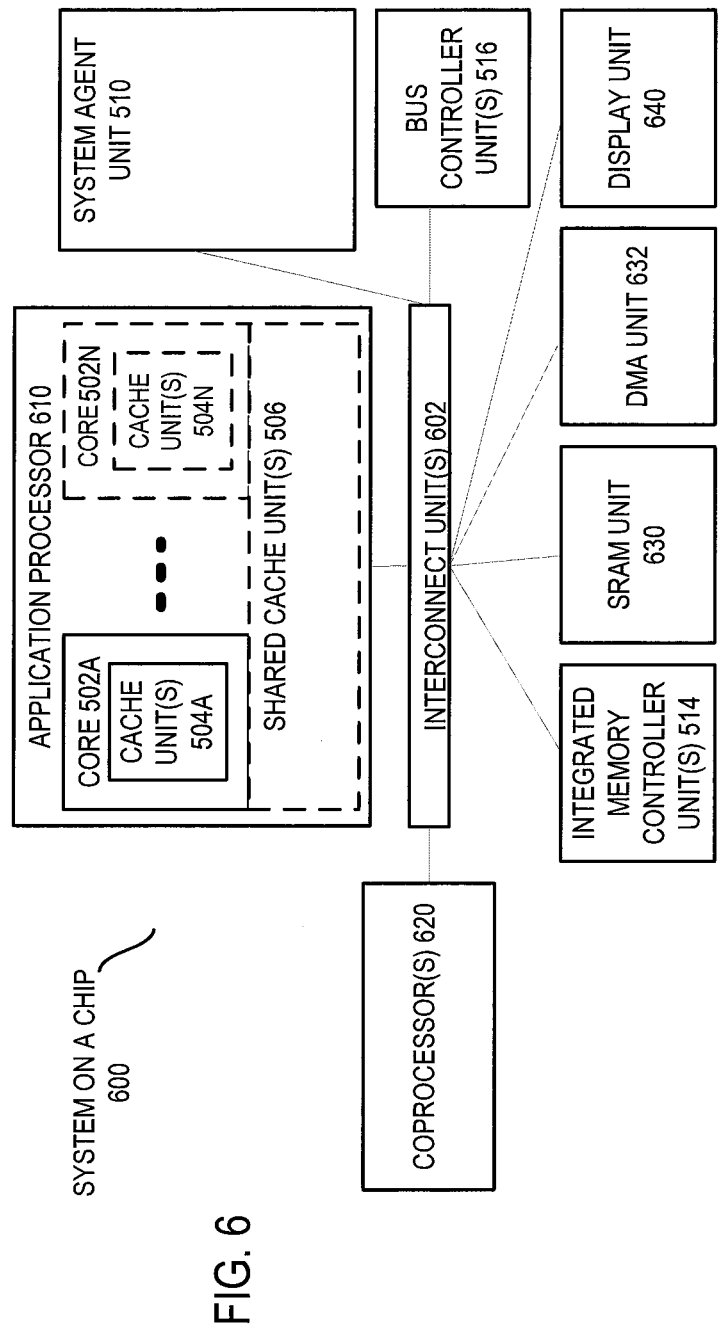
FIG. 6 illustrates a block diagram of a system on a chip (SoC) in accordance with an embodiment of the present invention.

Referring now to FIG. 6, shown is a block diagram of a SoC 600 in accordance with an embodiment of the present invention. Similar elements in FIG. 2 bear like reference numerals. Also, dashed lined boxes are optional features on more advanced SoCs. In FIG. 6, an interconnect unit(s) 602 is coupled to: an application processor 610 which includes a set of one or more cores 202A-N and shared cache unit(s) 206; a system agent unit 210; a bus controller unit(s) 216; an integrated memory controller unit(s) 214; a set or one or more coprocessors 620 which may include integrated graphics logic, an image processor, an audio processor, and a video processor; an static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 7:
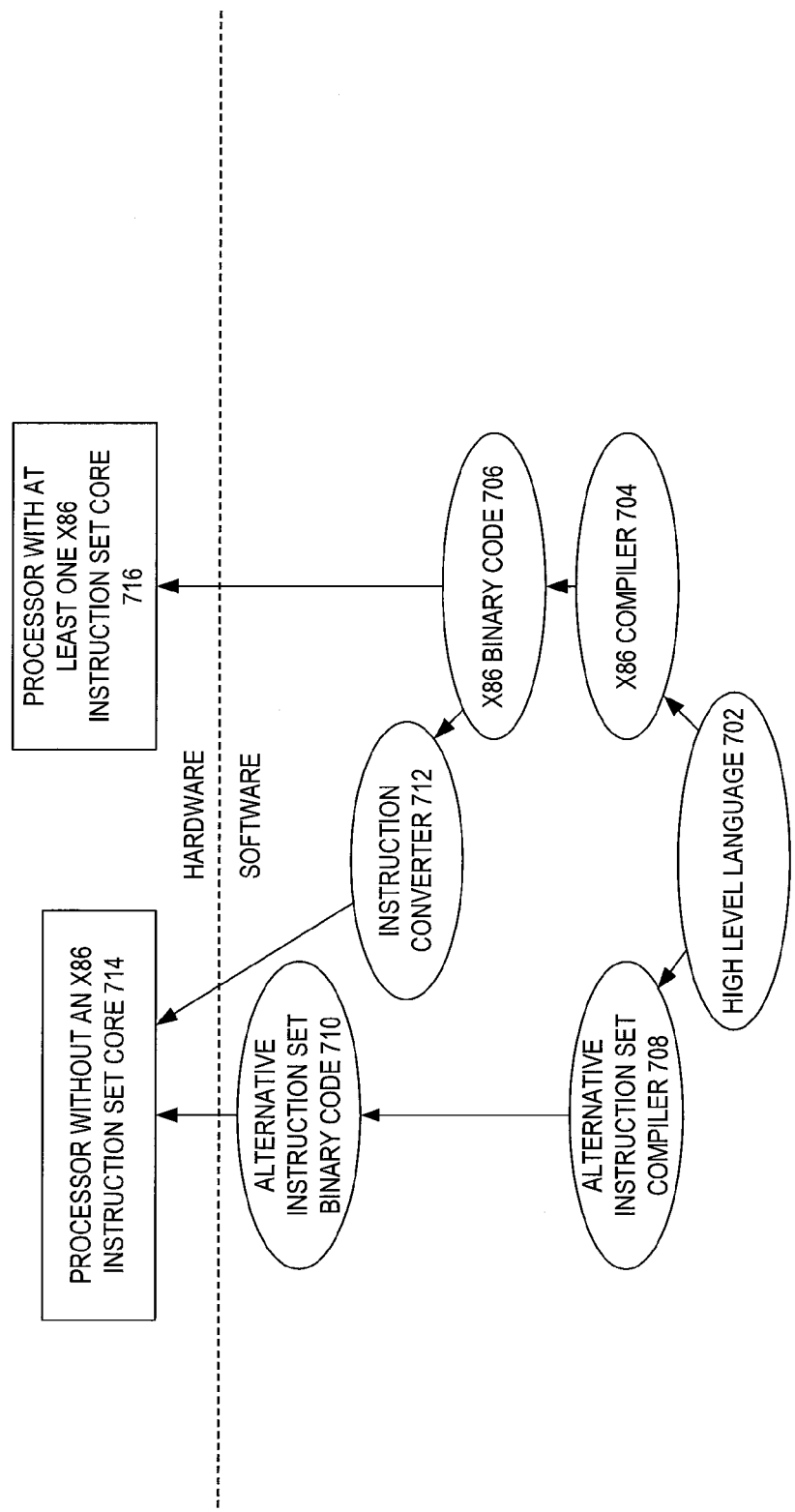
FIG. 7 illustrates a block diagram contrasting the use of a software instruction converter to convert binary instructions in a source instruction set to binary instructions in a target instruction set according to embodiments of the invention.

FIG. 7 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 7 shows a program in a high level language 702 may be compiled using an x86 compiler 704 to generate x86 binary code 706 that may be natively executed by a processor with at least one x86 instruction set core 716. The processor with at least one x86 instruction set core 716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 704 represents a compiler that is operable to generate x86 binary code 706 (e.g., object code) that can, with or without additional linkage processing, be executed on the processor with at least one x86 instruction set core 716. Similarly, FIG. 7 shows the program in the high level language 702 may be compiled using an alternative instruction set compiler 708 to generate alternative instruction set binary code 710 that may be natively executed by a processor without at least one x86 instruction set core 714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 712 is used to convert the x86 binary code 706 into code that may be natively executed by the processor without an x86 instruction set core 714. This converted code is not likely to be the same as the alternative instruction set binary code 710 because an instruction converter capable of this is difficult to make; however, the converted code will accomplish the general operation and be made up of instructions from the alternative instruction set. Thus, the instruction converter 712 represents software, firmware, hardware, or a combination thereof that, through emulation, simulation or any other process, allows a processor or other electronic device that does not have an x86 instruction set processor or core to execute the x86 binary code 706.

Apparatus and Method for Page Walk Extension for Enhanced Security Checks

The embodiments of the invention described herein allow a processor such as a central processing unit (CPU) to add permissions, attributes and checks on top of the normal OS-provided attributes at a page-level granularity, for more precise control over memory pages. In one embodiment, these permissions, attributes, and checks are managed by a processor in the physical address space and are set to a 4 k page granularity. It should be noted, however, that the underlying principles of the invention are not limited to any particular page size.

In one embodiment, the processor itself manages the attributes and permissions in the physical address space. In addition to setting permissions, one embodiment of the invention provides an efficient mechanism for checking these permissions once an attempt is made to perform an operation on a page (e.g., a read or write operation). A processor may then take an action when it identifies a violation.

In the past, range registers have been used by a processors to configure memory ranges. However, range registers are very expensive resources and are inefficient for setting permissions and attributes on a per-page basis.

Figure 8:
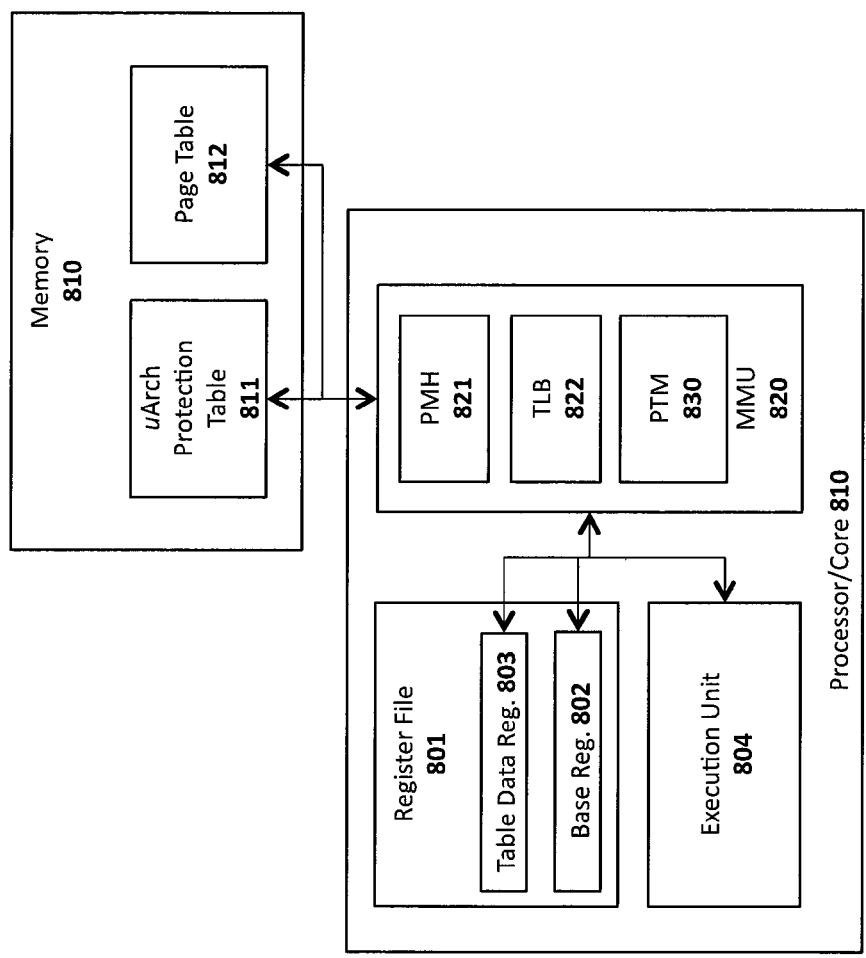
FIG. 8 are block diagrams illustrating a generic vector friendly instruction format and instruction templates thereof according to embodiments of the invention.

FIG. 8 illustrates an exemplary processor or core 810 which includes an execution unit 804 for executing instructions, a memory management unit (MMU) 820 for providing access to a main memory 810 (e.g., a random access memory), and a register file 801 for storing data and addresses for use by the execution unit 804 and MMU 820. As illustrated in FIG. 8, one embodiment of the invention includes a table in memory, referred to herein as a micro-architectural protection table 811 (hereinafter "protection table"), which contains an entry for each protected page. Protection table management logic (PTM) 830 within the processor may perform various operations described herein related to the protection table such as checking permissions in response to an attempt to access/modify a page, storing table data into one or more dedicated registers 803, and potentially modifying the protection table data (e.g., changing the permissions/attributes).

Figure 9:
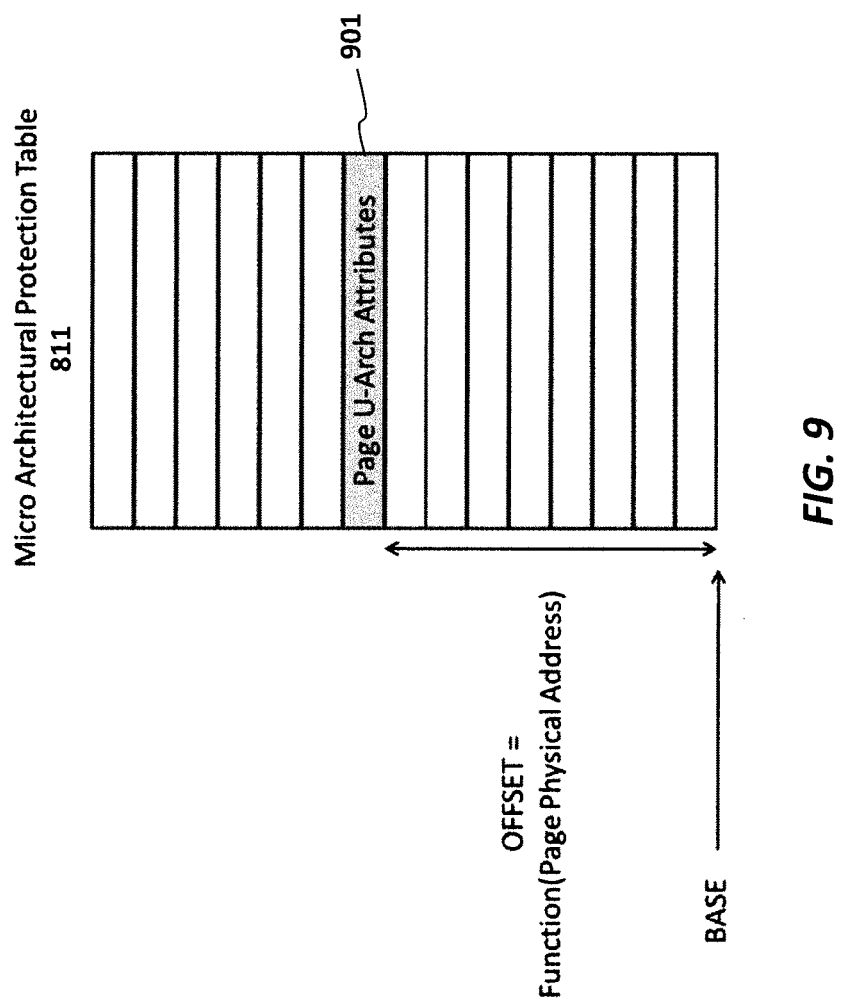
FIG. 9 illustrate a block diagrams of an exemplary specific vector friendly instruction format according to embodiments of the invention.

FIG. 9 illustrates an exemplary protection table 811 with one particular entry 901 being accessed using a base value and an offset value. In one embodiment, the protection table base address is defined in a hardware register 802 and the offset of a table entry is a function of the page physical address (PA). The function may comprise identifying certain bits of the PA to be used for the offset; however, any function of the PA may be employed. As illustrated, the table entry 901 contains attribute and/or permission information for the page with which it is associated. In one embodiment, the protection table 811 can be accessed only by the processor 810 itself—or, more specifically, by the protection table management logic (PTM) 830 within the processor—which may store the data retrieved from the protection table 811 in one or more dedicated registers 803. The PTM 830 may also check the data to determine permissions in response to an attempt to access/modify a page and take appropriate action if necessary. The PTM 830 may also potentially modify the data (e.g., change the permissions/attributes) and then store the results back to the protection table 811.

The MMU 820 may also include a translation lookaside buffer (TLB) 822 for caching virtual-to-physical address translations, and a page miss handler 821 for accessing address translations from a page table 812 in memory 810 in response to a TLB miss (i.e., when the required address translation is not stored in the TLB 822). For example, in one embodiment, a page miss handler (PMH) 821 manages the page walk operations described below for accessing the protection table 811.

An exemplary set of operations will now be described to illustrate how the processor/core 810 may check the permissions and attributes upon a page access. This embodiment of the invention employs techniques which have minimal performance impact and a minimal additional hardware requirements (i.e., the power, area and timing impact of these techniques are negligible). Specifically, in one embodiment, the existing PMH 821 page walk finite state machine (FSM) is used to access the protection table 811 and to check the permissions and attributes of the accessed page.

The PMH 821 initially holds an indication as to whether or not the table should be accessed. If so, then the PMH 821 performs an architectural page walk, including intermediate EPT walks if required, until the walk is completed and the (platform) physical address (PA) associated with the protection table entry is available. In one embodiment, if a protection table access is required, the PMH 821 performs an additional, micro-architectural stuffed load to the page entry in the table. As mentioned, the address of the stuffed load is the table base combined with the offset (while the offset is a function of the PA as mentioned above).

In one embodiment, the data which is returned from the protection table 811 is latched in dedicated registers 803, to prevent the overriding of the PA or any architectural attribute. The MMU 820 may calculate whether the access is legal, according to the content of the protection table entry. If the access is illegal, the processor may take a specified action.

In one embodiment, the TLB 822 may hold some of the attributes/permissions of the protection table entry in new, dedicated bits. For example, if the table entry contains a write permission attribute bit ("W"), this bit will be cached in the TLB 822. Consequently, if the page table entry has "W"=0 (write not permitted), a load to this page would be legal, but a later store which hits the TLB 822 would be illegal and the CPU will identify it as such.

Figure 10:
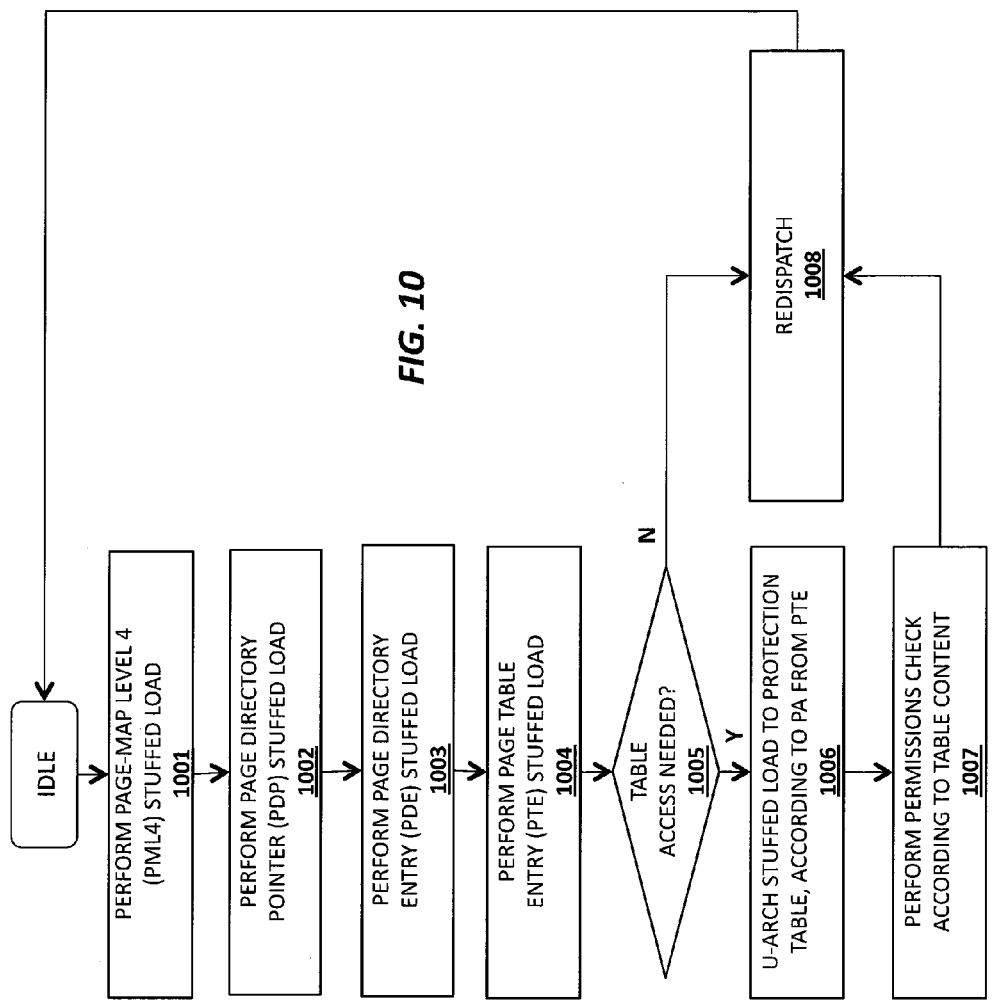
FIG. 10 is a block diagram of a register architecture according to one embodiment of the invention.

FIG. 10 illustrates an exemplary extended page walk performed by the PMH 821 in accordance with one embodiment of the invention (e.g., performed by the PMH's finite state machine). The flow chart shows a "mode L" page walk with no intermediate EPT walks and an address translation of a small page (4K). The same basic principles may be implemented for other page walk modes using EPT walks and using larger page sizes (which are well understood by those of skill in the art). Each state may, when implemented, result in various sub-states connected by additional transition arrows. These additional details have not been provided, however, to avoid obscuring the underlying principles of the invention.

The illustrated implementation may use an Intel 64 paging mode which maps a 64-bit virtual address to a physical address through a four-level hierarchical paging structure (although the actual number of bits supported in the virtual or physical address spaces may be implementation-dependent). This particular implementation includes a PML4 page vector and a page directory pointer (PDP) page vector to track the additional page tables used in the Intel 64 paging structure. For example, each entry in a PML4 page may reference a PDP page and each entry in the PDP page may reference a page directory having page directory entries (PDEs) which, in turn, may reference a page table entry (PTE).

Thus, turning to FIG. 10, at 1001, a page-map level 4 (PML4) stuffed load operation is performed. As is understood by those of skill in the art, "stuffed loads" are used for accessing the page table and are different from regular data loads. For example, they are not allocated in the reservation station (RS) and reorder buffer (ROB), nor dispatched and ordered by the RS and ROB. In this manner, the PMH 821 performs a page table walk without incurring any latency associated with the instruction decoding, allocation, and execution associated with regular loads which are processed by the RS and ROB, and without hindering or delaying the execution pipeline.

Using the results of the PML4 stuffed load, at 1002 a page directory pointer (PDP) stuffed load operation is performed to identify and load a page directory. At 1003, a page directory entry (PDE) stuffed load operation is performed to identify and load a page table. At 1004, a page table entry (PTE) stuffed load operation is performed to identify and load a PTE from the page table. At each of the foregoing stages, the PMH 821 uses different portions of the linear address to calculate the respective page information. In addition, at each stage, the retrieved page information may be cached within dedicated caches for future use. Moreover, while described for small pages (e.g., 4 k pages), the same underlying principles may be implemented for large pages by splitting large pages into smaller pages.

At 1005, a determination is made as to whether access to the protection table is required. This may be determined based on the contents of a control register or a determination that a particular address is within a designated protection range. If table access is needed, then the micro-architectural stuffed load is performed to the protection table according to the physical address retrieved from the PTE. As mentioned, the stuffed load may cause the protection table data to be loaded within a dedicated register 803 accessible only by the processor 810. Finally, at 1007 a permission check is performed using the protection table data and prevents operations from being performed which violate the designated permissions. For example, if the protection data specifies that a write operation to a particular page may not be performed, and a process attempts to write to the page, then the processor 810 will prevent the write operation from occurring. Various other types of permissions may be checked while still complying with the underlying principles of the invention.

Regardless of whether table access is needed, at 1008, a re-dispatch occurs and the process returns back to the idle state. In one embodiment, if table access is needed, then the re-dispatch occurs concurrently with the permission check operation at 1007.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A processor comprising:
   protection table management logic to manage a protection table, the protection table having one entry for each protected page or each group of protected pages in a memory;
   wherein entries in the protection table contain permission information indicating that a particular protected page cannot be accessed in a certain manner, and wherein the protection table management logic prevents direct access to the protection table by user application program code and operating system program code but permits direct access by the processor, wherein the direct access by the processor includes loading data from the protection table into a dedicated register accessible only by the processor.

2. The processor as in claim 1 further comprising:
   a base address register to store a base address of the protection table.

3. The processor as in claim 2 wherein a protection table entry is identified by combining the base address with an offset, wherein the offset is a function of a physical address (PA) of a protected page with which the protection table entry is associated.

4. The processor as in claim 1 further comprising:
   a page miss handler (PMH) to manage page walk operations for accessing the protection table from the memory.

5. The processor as in claim 4 further comprising:
   a translation lookaside buffer (TLB) for storing at least a portion of a protection table entry after the protection table entry has been accessed from the memory.

6. The processor as in claim 5 wherein the TLB further stores a virtual to physical address mapping associated with the protection table entry.

7. The processor as in claim 1, wherein the certain manner comprises the particular protected page being written to, the particular protected page being read, the particular protected page being executed, or attributes of the particular protected page being overridden.

8. A method comprising:
   storing a protection table in a memory, the protection table having one entry for each protected page or each group of protected pages in the memory, wherein entries in the protection table contain permission information indicating that a particular protected page cannot be accessed in a certain manner;
   preventing direct access to the protection table by user application program code or operating system program code; and
   allowing direct access to the protection table by a processor, wherein the direct access by the processor includes loading data from the protection table into a dedicated register accessible only by the processor.

9. The method as in claim 8 further comprising:
   storing a base address of the protection table in a base address register.

10. The method as in claim 9 wherein a protection table entry is identified by combining the base address with an offset, wherein the offset is a function of a physical address (PA) of a protected page with which the protection table entry is associated.

11. The method as in claim 8 further comprising:
    managing page walk operations for accessing the protection table from the memory with a page miss handler (PMH).

12. The method as in claim 11 further comprising:
    storing at least a portion of a protection table entry in a translation lookaside buffer (TLB) after the protection table entry has been accessed from the memory.

13. The method as in claim 12 wherein the TLB further stores a virtual to physical address mapping associated with the protection table entry.

14. The method as in claim 8, wherein the certain manner comprises the particular protected page being written to, the particular protected page being read, the particular protected page being executed, or attributes of the particular protected page being overridden.

15. A system comprising:
    a memory for storing a protection table, the protection table having one entry for each protected page or each group of protected pages in the memory, wherein entries in the protection table contain permission information indicating that a particular protected page cannot be accessed in a certain manner;
    a processor comprising:
    protection table management logic to manage the protection table,
    wherein the protection table management logic prevents direct access to the protection table by user application program code and operating system program code but permits direct access by the processor, wherein the direct access by the processor includes loading data from the protection table into a dedicated register accessible only by the processor.

16. The system as in claim 15 further comprising:
    a base address register to store a base address of the protection table.

17. The system as in claim 16 wherein a protection table entry is identified by combining the base address with an offset, wherein the offset is a function of a physical address (PA) of a protected page with which the protection table entry is associated.

18. The system as in claim 15 further comprising:
    a page miss handler (PMH) to manage page walk operations for accessing the protection table from the memory.

19. The system as in claim 18 further comprising:
    a translation lookaside buffer (TLB) for storing at least a portion of a protection table entry after the protection table entry has been accessed from the memory.

20. The system as in claim 19 wherein the TLB further stores a virtual to physical address mapping associated with the protection table entry.

21. The system as in claim 15, wherein the certain manner comprises the particular protected page being written to, the particular protected page being read, the particular protected page being executed, or attributes of the particular protected page being overridden.

* * * * *